(12) United States Patent
Han et al.

(10) Patent No.: US 9,256,310 B2
(45) Date of Patent: Feb. 9, 2016

(54) TOUCH SENSOR INTEGRATED TYPE DISPLAY DEVICE

(71) Applicant: LG Display Co., Ltd., Seoul (KR)

(72) Inventors: Manhyeop Han, Seoul (KR); Jinseong Kim, Jeollabuk-do (KR)

(73) Assignee: LG Display Co., Ltd., Seoul (KR)

( * ) Notice: Subject to any disclaimer, the term of this patent is extended or adjusted under 35 U.S.C. 154(b) by 24 days.

(21) Appl. No.: 14/096,197

(22) Filed: Dec. 4, 2013

(65) Prior Publication Data

US 2014/0168537 A1 Jun. 19, 2014

(30) Foreign Application Priority Data

Dec. 13, 2012 (KR) .................. 10-2012-0145339

(51) Int. Cl.
| | |
|---|---|
| *G06F 3/041* | (2006.01) |
| *G06F 3/044* | (2006.01) |
| *G02F 1/1333* | (2006.01) |
| *G02F 1/1362* | (2006.01) |
| *G02F 1/1343* | (2006.01) |

(52) U.S. Cl.
CPC .......... *G06F 3/0412* (2013.01); *G02F 1/13338* (2013.01); *G06F 3/044* (2013.01); *G02F 1/136204* (2013.01); *G02F 2001/134372* (2013.01)

(58) Field of Classification Search
CPC .......... G02F 1/13338; G02F 1/136204; G02F 2001/134372; G06F 3/0412; G06F 3/0414; G06F 3/044
See application file for complete search history.

(56) References Cited

U.S. PATENT DOCUMENTS

| | | | |
|---|---|---|---|
| 2004/0036815 A1* | 2/2004 | Kim et al. .................. | 349/38 |
| 2011/0157039 A1* | 6/2011 | Shin et al. .................. | 345/173 |

* cited by examiner

*Primary Examiner* — Dennis Y Kim
(74) *Attorney, Agent, or Firm* — Morgan, Lewis & Bockius LLP

(57) ABSTRACT

A touch sensor integrated type display device includes gate lines and data lines; a plurality of pixel electrodes respectively formed in pixel areas defined by crossings of the gate and data lines; a first electrode formed between first pixel electrodes and in parallel with a first gate line of the gate lines, the first pixel electrodes being adjacent to each other with the first gate line interposed therebetween; second electrodes formed between second pixel electrodes and arranged in a line in parallel with a second gate line adjacent to the first gate line, the second pixel electrodes being adjacent to each other with the second gate line interposed therebetween; and third electrodes, each of which is formed in parallel with the data lines and contacts the second electrodes, at least a portion of each of the third electrodes overlapping the first and second pixel electrodes.

12 Claims, 7 Drawing Sheets

TOUCH SENSOR INTEGRATED TYPE DISPLAY DEVICE

This application claims the benefit of priority under 35 U.S.C. §119(a) to Korea Patent Application No. 10-2012-0145339 filed on Dec. 13, 2012, the entire contents of which is incorporated herein by reference herein in its entirety.

BACKGROUND OF THE INVENTION

1. Field of the Invention

Embodiments of the invention relate to a touch sensor integrated type display device capable of recognizing a user's touch operation.

2. Discussion of the Related Art

In recent years, various input devices such as a keyboard, a mouse, a joystick, and a digitizer have been used to construct interfaces between users and home appliances or information telecommunication devices. However, when the user makes use of these input devices, user's dissatisfaction increases because the user is required to know how to use the input devices and the input devices occupy space. Therefore, a convenient and simple input device that can reduce erroneous operation is required. In response to this demand, a touch sensor for enabling the user to input information by directly touching the screen with his or her hand or a pen was suggested.

The touch sensor has a simple configuration capable of reducing erroneous operations. The user can also perform an input action without using a separate input device, and can quickly and easily manipulate a device through contents displayed on the screen. Accordingly, the touch sensor has been applied to various display devices.

The touch sensor used in the display devices may be classified into an add-on type touch sensor and an on-cell type touch sensor. The add-on type touch sensor is configured such that the display device and the add-on type touch sensor are individually manufactured and then the add-on type touch sensor is attached to an upper substrate of the display device. The on-cell type touch sensor is configured such that components constituting the on-cell type touch sensor are directly formed on the surface of the upper glass substrate of the display device.

There is a problem that a thickness of the display device increases because the add-on type touch sensor has the structure in which the add-on type touch sensor is mounted on the display device. Further, the visibility of the display device is reduced because of a reduction in brightness of the display device due to the increased thickness.

On the other hand, the on-cell type touch sensor shares the glass substrate with the display device because the on-cell type touch sensor has the structure in which the on-cell type touch sensor is formed on the surface of the glass substrate of the display device. Therefore, a thickness of the display device using the on-cell type touch sensor is less than a thickness of the display device using the add-on type touch sensor. However, the entire thickness of the display device using the on-cell type touch sensor increases because of a touch driving electrode layer, a touch sensing electrode layer, and an insulating layer for insulating the touch driving electrode layer and the touch sensing electrode layer which constitute the on-cell type touch sensor.

Accordingly, there is a need for a touch sensor integrated type display device capable of solving the problems of the above-described kinds of touch sensors.

SUMMARY OF THE INVENTION

Embodiments of the invention provide a touch sensor integrated type display device capable of preventing a damage of the display device resulting from static electricity by dividing a common electrode and properly grouping the common electrodes so as to serve as a touch driving electrode and a touch sensing electrode and connecting some of the divided common electrodes to ground through an electrostatic discharge circuit.

Embodiments of the invention also provide a touch sensor integrated type display device capable of increasing touch sensitivity and reducing a parasitic capacitance by reducing mutual capacitance between touch driving electrodes and touch sensing electrodes.

In one aspect, there is a touch sensor integrated type display device including a plurality of gate lines and a plurality of data lines which are formed to cross over each other; a plurality of pixel electrodes respectively formed in pixel areas defined by crossings of the plurality of gate lines and the plurality of data lines; a first electrode formed between first pixel electrodes and in parallel with a first gate line of the plurality of gate lines, the first pixel electrodes being adjacent to each other with the first gate line interposed therebetween; a plurality of second electrodes formed between second pixel electrodes and arranged in a line in parallel with a second gate line adjacent to the first gate line, the second pixel electrodes being adjacent to each other with the second gate line interposed therebetween; and a plurality of third electrodes, each of which is formed in parallel with the data lines and contacts the plurality of second electrodes, at least a portion of each of the plurality of third electrodes overlapping the first and second pixel electrodes.

The first electrode is a touch driving electrode, and the plurality of third electrodes serve as both a common electrode and a touch sensing electrode.

The first electrode is a touch sensing electrode, and the plurality of third electrodes serve as both a common electrode and a touch driving electrode.

The touch sensor integrated type display device further includes at least one first electrode resistance reducing wire configured to overlap the first electrode along a direction of the first electrode and reduce a resistance of the first electrode.

The touch sensor integrated type display device further includes at least one second electrode resistance reducing wire configured to overlap each of the plurality of second electrodes along a direction of the second electrodes and reduce resistances of the second electrodes.

The touch sensor integrated type display device further includes at least one third electrode resistance reducing wire configured to overlap each of the plurality of third electrodes along a direction of the third electrodes and reduce resistances of the third electrodes.

In another aspect, there is a touch sensor integrated type display device including a plurality of gate lines formed in parallel on a substrate; a gate insulating layer configured to cover the gate lines; a plurality of data lines formed on the gate insulating layer to cross over the gate lines; a plurality of thin film transistors respectively formed in a plurality of pixel areas defined by crossings of the gate lines and the data lines; a first passivation layer configured to cover the gate insulating layer, on which the plurality of thin film transistors are formed; a plurality of pixel electrodes formed on the first passivation layer in the plurality of pixel areas, respectively; a first electrode formed between first pixel electrodes and in parallel with a first gate line of the plurality of gate lines, the first pixel electrodes being adjacent to each other with the first gate line interposed therebetween; a plurality of second electrodes formed between second pixel electrodes and arranged in a line in parallel with a second gate line adjacent to the first gate line, the second pixel electrodes being adjacent to each other with the second gate line interposed therebetween; and a second passivation layer configured to cover the first electrode and the plurality of second electrodes, the second passivation layer including contact holes exposing the plurality of second electrodes; and a plurality of third electrodes, each of which is formed in parallel with the data lines and contacts the plurality of second electrodes through the contact holes, at least a portion of each of the plurality of third electrodes overlapping the first and second pixel electrodes.

The first electrode is a touch driving electrode, and the plurality of third electrodes serve as both a common electrode and a touch sensing electrode.

The first electrode is a touch sensing electrode, and the plurality of third electrodes serve as both a common electrode and a touch driving electrode.

In yet another aspect, there is a touch sensor integrated type display device including a plurality of gate lines formed in parallel on a substrate; a gate insulating layer configured to cover the gate lines; a plurality of data lines formed on the gate insulating layer to cross the gate lines; a plurality of thin film transistors respectively formed in a plurality of pixel areas defined by crossings of the gate lines and the data lines; a first passivation layer configured to cover the gate insulating layer, on which the plurality of thin film transistors are formed; a plurality of first electrodes positioned on the first passivation layer and arranged in parallel with the data lines, each of the plurality of first electrodes being formed in at least two pixel areas which are positioned with the gate line interposed therebetween; a second passivation layer configured to cover the plurality of first electrodes, the second passivation layer including a plurality of contact holes exposing the plurality of first electrodes; a plurality of pixel electrodes formed on the second passivation layer in the plurality of pixel areas, respectively, at least a portion of each of the plurality of pixel electrodes overlapping the first electrode; a second electrode formed on the second passivation layer between first pixel electrodes and in parallel with a first gate lines of the plurality of gate lines, the first pixel electrodes being adjacent to each other with the first gate line interposed therebetween; and a third electrode formed on the second passivation layer between second pixel electrodes, arranged in a line in parallel with a second gate line adjacent to the first gate line, and contacting the plurality of first electrodes exposed through the plurality of contact holes, the second pixel electrodes being adjacent to each other with the second gate line interposed therebetween The plurality of first electrodes serve as both a touch driving electrode and a common electrode, and the plurality of second electrodes are a touch sensing electrode.

The plurality of first electrodes serve as both a touch sensing electrode and a common electrode, and the plurality of second electrodes are a touch driving electrode.

As described above, the touch sensor integrated type display device according to the embodiments of the invention can reduce the number of touch driving electrodes or the number of touch sensing electrodes used as the touch effective electrode by connecting the touch non-driving electrodes to the touch sensing electrode or by connecting the touch non-sensing electrodes to the touch driving electrode. Hence, the touch sensor integrated type display device according to the embodiments of the invention can reduce the mutual capacitance between the touch driving electrodes and the touch sensing electrodes, thereby making it possible to prevent a reduction in the touch sensitivity and an increase in the parasitic capacitance and further improve a touch performance.

Furthermore, the touch sensor integrated type display device according to the embodiments of the invention can use the common electrode, which is used to form an electric field required to drive liquid crystals of the display device, along with the pixel electrode as the touch driving electrode or the touch sensing electrode, thereby making it possible to omit a process for forming the touch driving electrode or the touch sensing electrode and reduce a thickness of the touch sensor integrated type display device by a thickness of the touch driving electrode or the touch sensing electrode.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. In the following description, a touch sensor integrated type liquid crystal display is used as an example of a touch sensor integrated type display device.

Figure 1:
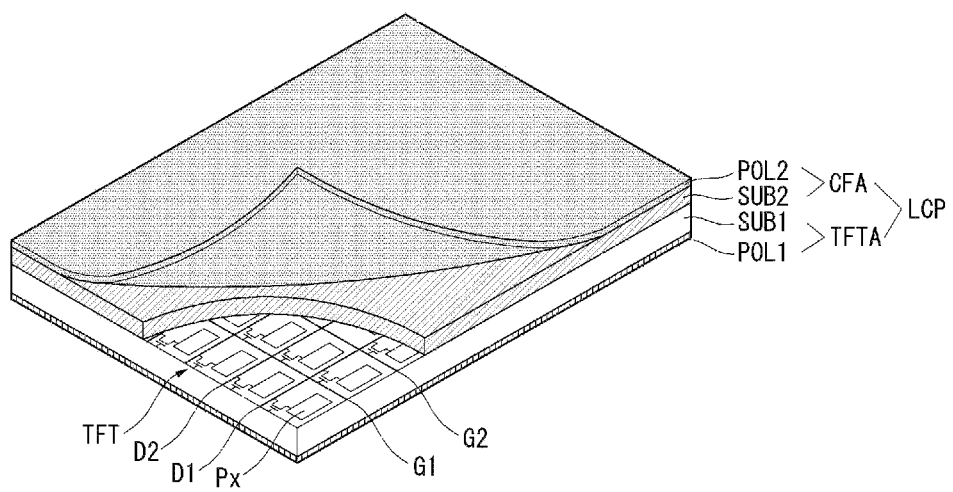
FIG. 1 is a partial exploded perspective view schematically showing a display device.
Figure 2:
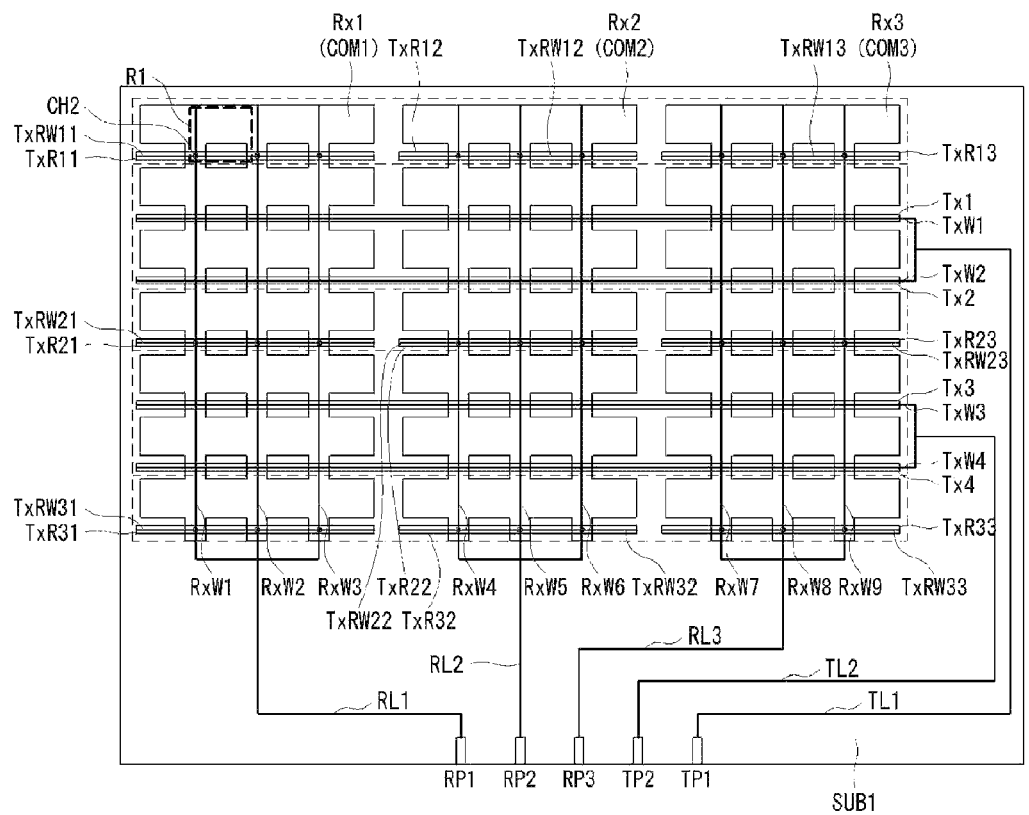
FIG. 2 is a plane view of a touch sensor integrated type display device according to a first embodiment of the invention.
Figure 3:
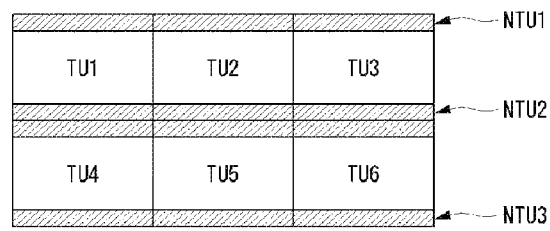
FIG. 3 shows a touch effective area and a touch non-effective area formed by touch driving electrodes and touch sensing electrodes shown in FIG. 2.
Figure 4:
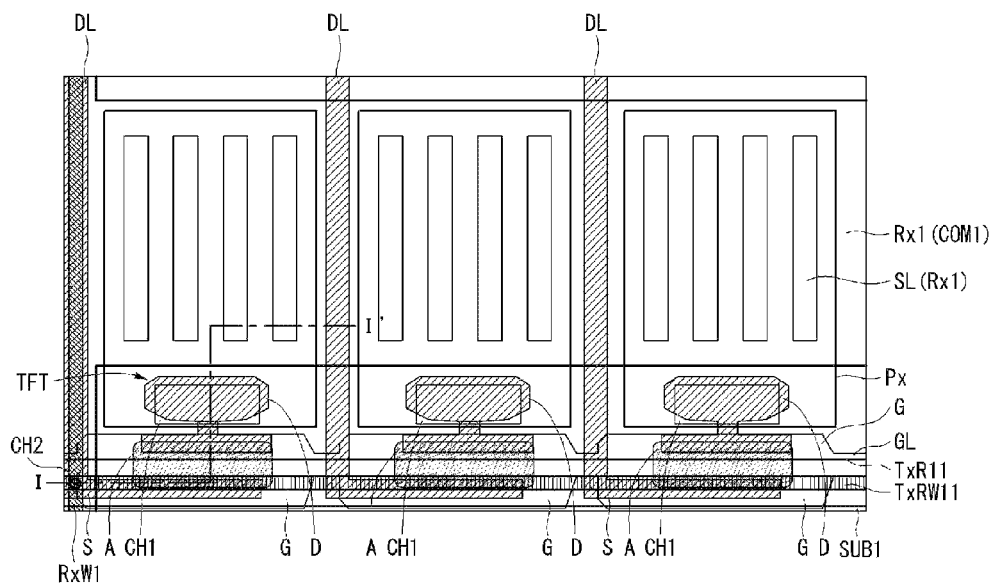
FIG. 4 is a plane view showing in detail an area R1 shown in FIG. 2.
Figure 5:
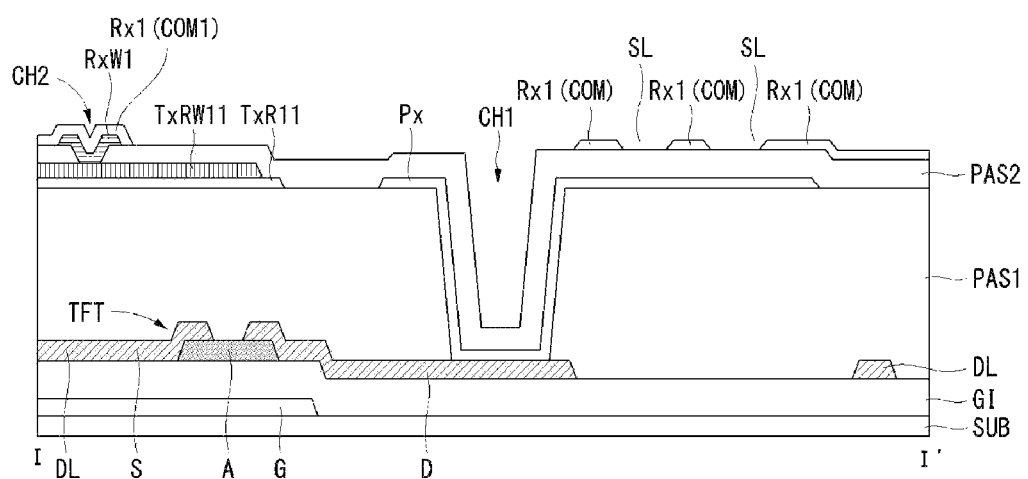
FIG. 5 is a cross-sectional view taken along line IT shown in FIG. 4.

A touch sensor integrated type display device according to a first embodiment of the invention is described in detail with reference to FIGS. 1 to 5. FIG. 1 is a partial exploded perspective view schematically showing a display device. FIG. 2 is a plane view of a touch sensor integrated type display device according to a first embodiment of the invention. FIG. 3 shows a touch effective area and a touch non-effective area formed by touch driving electrodes and touch sensing electrodes shown in FIG. 2. FIG. 4 is a plane view showing in detail an area R1 shown in FIG. 2. FIG. 5 is a cross-sectional view taken along line I-I' shown in FIG. 4.

As shown in FIG. 1, a touch sensor integrated type display device according to an embodiment of the invention includes a liquid crystal display panel LCP including a thin film transistor (TFT) array TFTA and a color filter array CFA which are positioned opposite each other with a liquid crystal layer (not shown) interposed therebetween.

The TFT array TFTA includes a plurality of gate lines G1 and G2 which are formed in parallel on a first substrate SUB1 in a first direction (for example, x-axis direction), a plurality of data lines D1 and D2 which are formed in parallel in a second direction (for example, y-axis direction) to cross the plurality of gate lines G1 and G2, thin film transistors TFT formed at crossings of the gate lines G1 and G2 and the data lines D1 and D2, a plurality of pixel electrodes Px for charging liquid crystal cells to a data voltage, and a plurality of common electrodes (not shown) positioned opposite the plurality of pixel electrodes Px.

The color filter array CFA includes black matrixes (not shown) and color filters (not shown), which are formed on a second substrate SUB2. Polarizing plates POL1 and POL2 are respectively attached to outer surfaces of the first substrate SUB1 and the second substrate SUB2 of the liquid crystal display panel LCP. Alignment layers (not shown) for setting a pre-tilt angle of liquid crystals are respectively formed on inner surfaces of the first substrate SUB1 and the second substrate SUB2 contacting the liquid crystals. A column spacer may be formed between the first substrate SUBS1 and the second substrate SUBS2 to maintain cell gaps of the liquid crystal cells.

The common electrodes are formed on the second substrate SUB2 in a vertical electric field driving manner such as a twisted nematic (TN) mode and a vertical alignment (VA) mode. Further, the common electrodes are formed on the first substrate SUB1 along with the pixel electrodes Px in a horizontal electric field driving manner such as an in-plane switching (IPS) mode and a fringe field switching (FFS) mode. In the embodiment of the invention, the common electrodes in the horizontal electric field driving manner are described as an example.

Referring to FIGS. 2 and 3, the common electrode according to the first embodiment of the invention is divided into the plurality of common electrodes and serves as a touch sensing electrode. Thus, in the following description, the common electrode is referred to as the common electrode serving as the touch sensing electrode, the touch sensing electrode, or the touch sensing electrode serving as the common electrode, if necessary or desired.

As shown in FIG. 2, the common electrodes include a plurality of first to third common electrodes COM1 to COM3 divided in the second direction (for example, y-axis direction). Each of the first to third common electrodes COM1 to COM3 is configured so that a plurality of electrode patterns having a predetermined shape are connected to one another by connection portions and form electrode lines in the y-axis direction. In the first embodiment of the invention, the electrode patterns have a rectangular shape as an example, but may have other shapes. The first to third common electrodes COM1 to COM3 thus formed serve as first to third touch sensing electrodes Rx1, Rx2, and Rx3. Each electrode pattern forming the touch sensing electrodes Rx1 to Rx3 serving as the common electrode may be formed so that its size corresponds to the pixel electrode at a ratio one to one. Alternatively, each electrode pattern forming the touch sensing electrodes Rx1 to Rx3 serving as the common electrode may be formed so that its size corresponds to several to several hundreds of pixel electrodes.

The first to third touch sensing electrodes Rx1, Rx2, and Rx3 include touch sensing electrode resistance reducing wires RxW1 to RxW3, RxW4 to RxW6, and RxW7 to RxW9 for reducing a resistance thereof, respectively. More specifically, the first touch sensing electrode Rx1 contacts the three first touch sensing electrode resistance reducing wires RxW1 to RxW3 arranged in the y-axis direction; the second touch sensing electrode Rx2 contacts the three second touch sensing electrode resistance reducing wires RxW4 to RxW6 arranged in the y-axis direction; and the third touch sensing electrode Rx3 contacts the three third touch sensing electrode resistance reducing wires RxW7 to RxW9 arranged in the y-axis direction. The first to third touch sensing electrode resistance reducing wires RxW1 to RxW3, RxW4 to RxW6, and RxW7 to RxW9 thus formed are connected to first to third sensing routing pads RP1, RP2, and RP3 through first to third sensing routing wires RL1, RL2, and RL3, respectively. The first to third touch sensing electrode resistance reducing wires RxW1 to RxW3, RxW4 to RxW6, and RxW7 to RxW9 are formed of a metal material having a low resistance, for example, Al, AlNd, Mo, MoTi, Cu, Cr, Ag, and Ag-based alloys, so as to reduce the resistances of the first to third touch sensing electrodes Rx1 to Rx3 formed of a transparent conductive material such as indium tin oxide (ITO), indium zinc oxide (IZO), and gallium-doped zinc oxide (GZO).

The TFT array TFTA is formed to cross connection portions of the first to third common electrodes COM1 to COM3 (i.e., the touch sensing electrodes Rx1 to Rx3) and includes first to fourth touch driving electrodes Tx1 to Tx4 forming electrode lines in the first direction (for example, x-axis direction).

The first to fourth touch driving electrodes Tx1 to Tx4 are grouped into two parts by connection wires, and then the two parts are respectively connected to first and second touch driving pads TP1 and TP2 through first and second touch driving routing wires TL1 and TL2. More specifically, the first and second touch driving electrodes Tx1 and Tx2 are connected to the first touch driving pad TP1 through the first touch driving routing wire TL1, and the third and fourth touch driving electrodes Tx3 and Tx4 are connected to the second touch driving pad TP2 through the second touch driving routing wire TL2. The first embodiment of the invention described that the touch driving electrodes are grouped into the two parts as an example, but is not limited thereto. For example, the touch driving electrodes may be grouped into several to several hundreds of parts.

Further, the TFT array TFTA is formed to cross connection portions of the first to third touch sensing electrodes Rx1 to Rx3. The TFT array TFTA includes first to third touch non-driving electrodes TxR11 to TxR13, TxR21 to TxR23, and TxR31 to TxR33 arranged in the first direction (for example, x-axis direction) and the second direction (for example, y-axis direction).

In the first touch non-driving electrodes TxR11 to TxR13, the 1-1 touch non-driving electrodes TxR11 is formed to cross a connection portion between adjacent electrode patterns of the first touch sensing electrode Rx1 and is connected to the first touch sensing electrode Rx1 through a contact hole CH2 at a crossing. The 1-2 touch non-driving electrodes TxR12 is formed to cross a connection portion between adjacent electrode patterns of the second touch sensing electrode Rx2 and is connected to the second touch sensing electrode Rx2 through the contact hole CH2 at a crossing. The 1-3 touch non-driving electrodes TxR13 is formed to cross a connection portion between adjacent electrode patterns of the third touch sensing electrode Rx3 and is connected to the third touch sensing electrode Rx3 through the contact hole CH2 at a crossing.

In the second touch non-driving electrodes TxR21 to TxR23, the 2-1 touch non-driving electrodes TxR21 is formed to cross a connection portion between adjacent electrode patterns of the first touch sensing electrode Rx1 and is connected to the first touch sensing electrode Rx1 through the contact hole CH2 at a crossing. The 2-2 touch non-driving electrodes TxR22 is formed to cross a connection portion between adjacent electrode patterns of the second touch sensing electrode Rx2 and is connected to the second touch sensing electrode Rx2 through the contact hole CH2 at a crossing. The 2-3 touch non-driving electrodes TxR23 is formed to cross a connection portion between adjacent electrode patterns of the third touch sensing electrode Rx3 and is connected to the third touch sensing electrode Rx3 through the contact hole CH2 at a crossing.

In the third touch non-driving electrodes TxR31 to TxR33, the 3-1 touch non-driving electrodes TxR31 is formed to cross a connection portion between adjacent electrode patterns of the first touch sensing electrode Rx1 and is connected to the first touch sensing electrode Rx1 through the contact hole CH2 at a crossing. The 3-2 touch non-driving electrodes TxR32 is formed to cross a connection portion between adjacent electrode patterns of the second touch sensing electrode Rx2 and is connected to the second touch sensing electrode Rx2 through the contact hole CH2 at a crossing. The 3-3 touch non-driving electrodes TxR33 is formed to cross a connection portion between adjacent electrode patterns of the third touch sensing electrode Rx3 and is connected to the third touch sensing electrode Rx3 through the contact hole CH2 at a crossing.

The first to third touch non-driving electrodes TxR11 to TxR13, TxR21 to TxR23, and TxR31 to TxR33 and the first to fourth touch driving electrodes Tx1 to Tx4 are alternately disposed at a proper rate of number. In the example of FIG. 3, the first to third touch non-driving electrodes TxR11 to TxR13, TxR21 to TxR23, and TxR31 to TxR33 and the first to fourth touch driving electrodes Tx1 to Tx4 are alternately disposed in such a manner that the touch non-driving electrodes TxR11 to TxR13, TxR21 to TxR23, or TxR31 to TxR33 of a first line are disposed and then the touch driving electrodes Tx1 and Tx2 or Tx3 and Tx4 of a second line are disposed. However, the embodiment of the invention is not limited thereto. Namely, the disposition order and the disposition number of electrodes may be properly changed, if necessary or desired.

In the above-described configuration, the first to third touch non-driving electrodes TxR11 to TxR13, TxR21 to TxR23, and TxR31 to TxR33 are not connected to the driving routing wires and are connected to the first to third touch sensing electrodes Rx1 to Rx3. Therefore, the first to third touch non-driving electrodes TxR11 to TxR13, TxR21 to TxR23, and TxR31 to TxR33 do not serve as the touch driving electrode and serve as the touch sensing electrode. Thus, because mutual capacitance is not generated between the first to third touch non-driving electrodes TxR11 to TxR13, TxR21 to TxR23, and TxR31 to TxR33 and electrode patterns of the touch sensing electrodes adjacent to them, the first to third touch non-driving electrodes TxR11 to TxR13, TxR21 to TxR23, and TxR31 to TxR33 are not used as an effective electrode for the touch recognition. Hence, the areas occupied by the first to third touch non-driving electrodes TxR11 to TxR13, TxR21 to TxR23, and TxR31 to TxR33 become a touch non-effective area as shown in FIG. 3.

In FIG. 3, reference symbols NTU1, NTU2, and NTU3 denote a touch non-effective area formed according to the first embodiment of the invention, and reference symbols TU1, TU2, TU3, TU4, TU5, and TU6 denote a touch effective area formed according to the first embodiment of the invention. The unit touch areas TU1, TU2, TU3, TU4, TU5, and TU6 each indicate an area in which the touch recognition is possible. As shown in FIG. 3, when the touch recognition is performed, the unit touch areas TU1, TU2, TU3, TU4, TU5, and TU6 include the touch non-effective areas NTU1, NTU2, and NTU3 formed by the first to third touch non-driving electrodes TxR11 to TxR13, TxR21 to TxR23, and TxR31 to TxR33.

Next, the structure of the touch sensor integrated type display device is described in detail with reference to FIGS. 2, 4, and 5.

As shown in FIGS. 2, 4, and 5, the touch sensor integrated type display device according to the first embodiment of the invention includes gate lines GL and data lines DL which are formed on the substrate SUB1 of the TFT array TFTA to cross each other, thin film transistors TFT formed at crossings of the gate lines GL and the data lines DL, pixel electrodes Px formed in areas defined by crossings of the gate lines GL and the data lines DL, and common electrodes COM positioned opposite the pixel electrodes Px.

The thin film transistor TFT includes a gate electrode G extending from the gate line GL formed on the substrate SUB1, an active layer A which is formed on a gate insulation layer GI covering the gate line GL and the gate electrode G at a location corresponding to the gate electrode G, a source electrode S extending from the data line DL which is formed on a first passivation layer PAS1 covering the active layer A, and a drain electrode D positioned opposite the source electrode S. The thin film transistor TFT thus formed is covered by the first passivation layer PAS1, and a portion of the drain electrode D of the thin film transistor TFT is exposed through a first contact hole CH1 formed in the first passivation layer PAS1.

The pixel electrodes Px are formed in pixel areas, on the first passivation layer PAS1, which are defined by the crossings of the gate lines GL and the data lines DL. Referring to FIGS. 2, 4, and 5, the touch non-driving electrodes TxR11 to TxR13, TxR21 to TxR23, and TxR31 to TxR33 and the touch driving electrodes Tx1 to Tx4 are formed between the pixel electrodes Px, which are adjacent to each other with the gate line GL interposed therebetween, in parallel with the gate line GL. FIGS. 4 and 5 show only the touch non-driving electrodes of the touch non-effective area for the sake of brevity and ease of reading. At least a portion of each of the touch non-driving electrodes TxR11 to TxR13, TxR21 to TxR23, and TxR31 to TxR33 and the touch driving electrodes Tx1 to Tx4 may overlap or may not overlap the gate line GL. Each pixel electrode Px is connected to the drain electrode D of the thin film transistor TFT exposed through the first contact hole CH1 formed in the first passivation layer PAS1.

Touch non-driving electrode resistance reducing wires TxRW11 to TxRW13, TxRW21 to TxRW23, and TxRW31 to TxRW33 for resistance reduction are respectively formed on the touch non-driving electrodes TxR11 to TxR13, TxR21 to TxR23, and TxR31 to TxR33 of the touch non-effective areas NTU1 to NTU3. Touch driving electrode resistance reducing wires TxW1 to TxW4 for resistance reduction are respectively formed on the touch driving electrodes Tx1 to Tx4 of the touch effective areas TU1 to TU6. The touch driving electrodes Tx1 to Tx4 are connected to the first and second touch driving routing wires TL1 and TL2 based on a predetermined rate of number, and thus may be easily grouped.

A second passivation layer PAS2 is formed on the entire surface of the first passivation layer PAS1, on which the touch non-driving electrodes TxR11 to TxR13, TxR21 to TxR23, and TxR31 to TxR33, the touch non-driving electrode resistance reducing wires TxRW11 to TxRW13, TxRW21 to TxRW23, and TxRW31 to TxRW33, the touch driving electrodes Tx1 to Tx3 (refer to FIG. 2), the touch driving electrode resistance reducing wires TxW1 to TxW3 (refer to FIG. 2), and the pixel electrodes Px are formed. The second passivation layer PAS2 includes the second contact holes CH2 formed at crossings between connection portions for connecting adjacent electrode patterns in a plurality of electrode patterns constituting each of the first to third touch sensing electrodes Rx1 to Rx3 and the first to third touch non-driving electrodes TxR11 to TxR13, TxR21 to TxR23, and TxR31 to TxR33.

The touch sensing electrodes Rx1 to Rx3 serving as the common electrode are formed on the second passivation layer PAS2 including the second contact holes CH2 and overlaps the pixel electrode Px. The touch sensing electrodes Rx1 to Rx3 serving as the common electrode contact the touch non-driving electrodes TxR11 to TxR13, TxR21 to TxR23, and TxR31 to TxR33 and the touch non-driving electrode resistance reducing wires TxRW11 to TxRW13, TxRW21 to TxRW23, and TxRW31 to TxRW33 through the second contact holes CH2. The touch sensing electrodes Rx1 to Rx3 serving as the common electrode are formed in parallel with the data lines. When the touch sensing electrodes Rx1 to Rx3 serving as the common electrode are formed of a transparent conductive material such as ITO, IZO, and GZO, the touch sensing electrode resistance reducing wires RxW1 to RxW3, RxW4 to RxW6, and RxW7 to RxW9 are formed to contact the touch non-driving electrode resistance reducing wires TxRW11 to TxRW13, TxRW21 to TxRW23, and TxRW31 to TxRW33 through the second contact holes CH2, and the touch sensing electrodes Rx1 to Rx3 serving as the common electrode are respectively formed on the touch sensing electrode resistance reducing wires RxW1 to RxW3, RxW4 to RxW6, and RxW7 to RxW9. When the touch sensing electrodes Rx1 to Rx3 are formed to cover the touch sensing electrode resistance reducing wires RxW1 to RxW3, RxW4 to RxW6, and RxW7 to RxW9, the touch sensing electrode resistance reducing wires RxW1 to RxW3, RxW4 to RxW6, and RxW7 to RxW9 formed of the metal material may be prevented from being corroded.

In the first embodiment of the invention, the touch sensing electrodes Rx1 to Rx3 serving as the common electrode are formed to overlap the pixel electrodes Px and are connected to one another in an arrangement direction of the data lines DL, thereby forming three sensing electrode lines as shown in FIG. 3. Further, each of the touch sensing electrodes Rx1, Rx2, and Rx3 serving as the common electrode may have a plurality of slits SL.

In the touch sensor integrated type display device according to the first embodiment of the invention, as shown in FIGS. 4 and 5, the pixel electrode Px formed on the first passivation layer PAS1 has no slit, and the touch sensing electrodes Rx1 to Rx3 serving as the common electrode formed on the second passivation layer PAS2 have the slits SL.

In the touch sensor integrated type display device according to the first embodiment of the invention, the common electrode performed the function of the touch sensing electrode as well as its function. However, the common electrode may perform a function of the touch driving electrode. In this instance, the touch driving electrode according to the first embodiment of the invention has to be configured as the touch sensing electrode.

Figure 6:
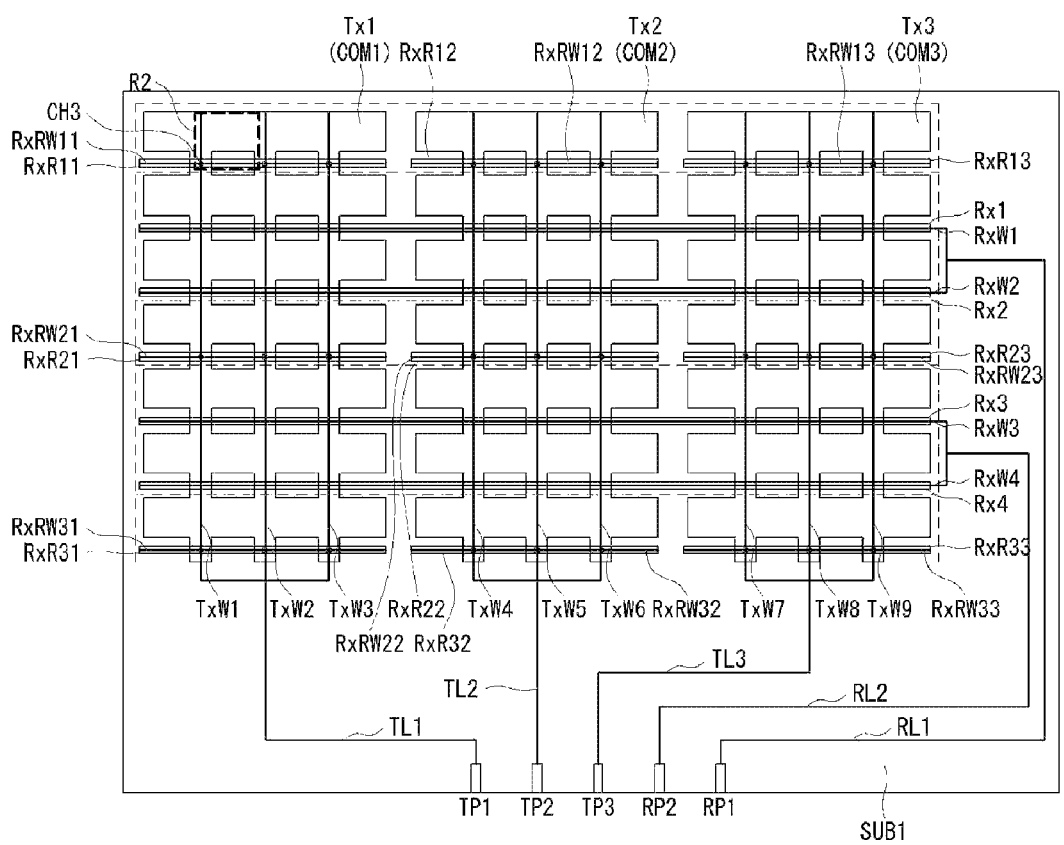
FIG. 6 is a plane view of a touch sensor integrated type display device according to a second embodiment of the invention.
Figure 7:
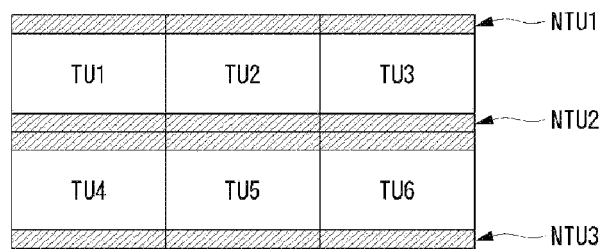
FIG. 7 shows a touch effective area and a touch non-effective area formed by touch driving electrodes and touch sensing electrodes shown in FIG. 6.
Figure 8:
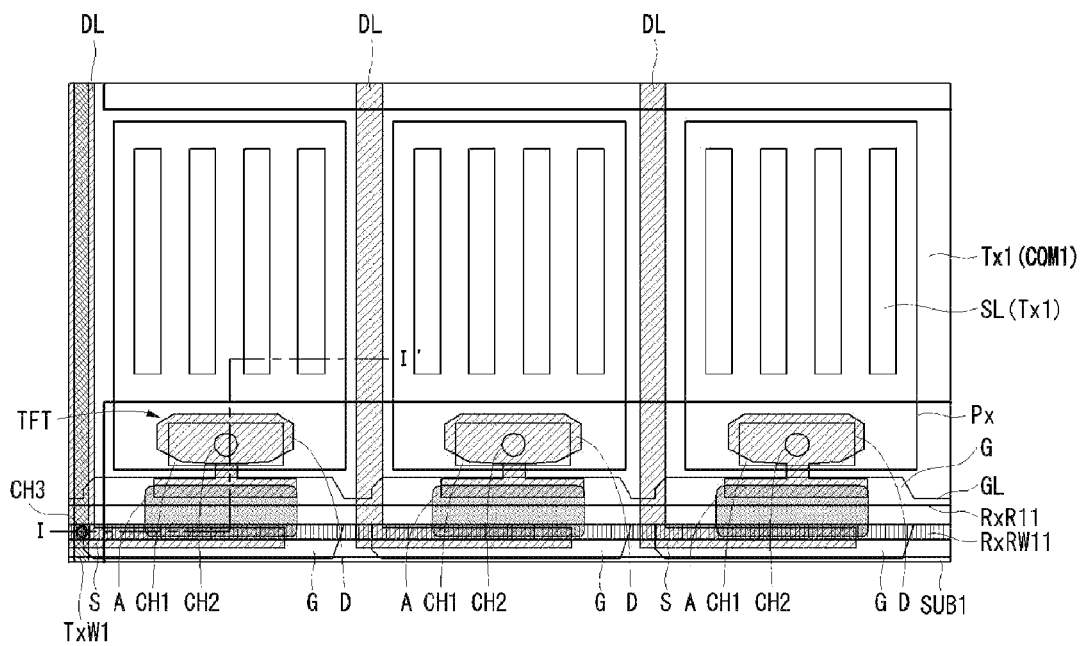
FIG. 8 is a plane view showing in detail an area R2 shown in FIG. 6.
Figure 9:
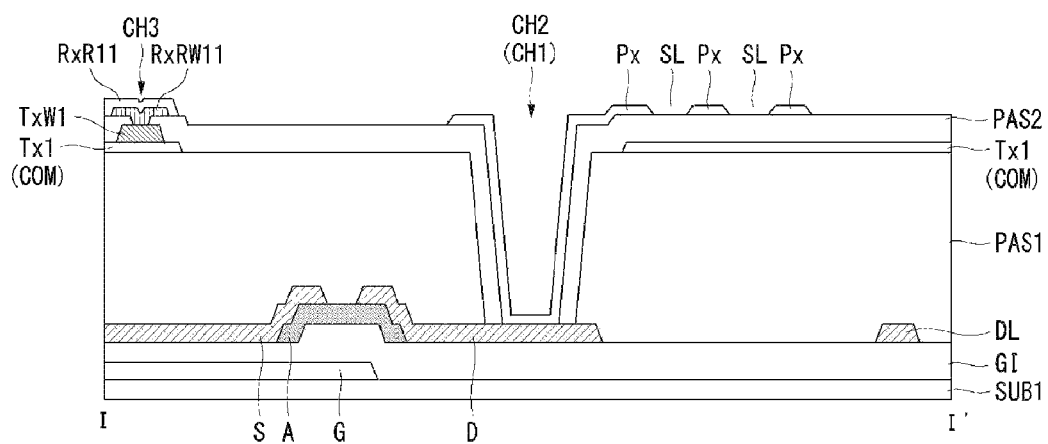
FIG. 9 is a cross-sectional view taken along line IT shown in FIG. 8.

Next, a touch sensor integrated type display device according to a second embodiment of the invention is described in detail with reference to FIGS. 6 to 9. FIG. 6 is a plane view of a touch sensor integrated type display device according to a second embodiment of the invention. FIG. 7 shows a touch effective area and a touch non-effective area formed by touch driving electrodes and touch sensing electrodes shown in FIG. 6. FIG. 8 is a plane view showing in detail an area R2 shown in FIG. 6. FIG. 9 is a cross-sectional view taken along line I-I' shown in FIG. 8.

Since configuration of a liquid crystal display panel of the touch sensor integrated type liquid crystal display according to the second embodiment of the invention is substantially the same as configuration of the liquid crystal display panel LCP of the touch sensor integrated type liquid crystal display according to the first embodiment of the invention, a further description may be briefly made or may be entirely omitted.

Referring to FIGS. 6 and 7, a common electrode according to the second embodiment of the invention is divided into a plurality of common electrodes and serves as a touch driving electrode. Thus, in the following description, the common electrode is referred to as the common electrode serving as the touch driving electrode, the touch driving electrode, or the touch driving electrode serving as the common electrode, if necessary or desired.

As shown in FIG. 6, the common electrodes include a plurality of first to third common electrodes COM1 to COM3 divided in a second direction (for example, y-axis direction). Each of the first to third common electrodes COM1 to COM3 is configured so that a plurality of electrode patterns having a predetermined shape are connected to one another by connection portions and form electrode lines in the y-axis direction. In the second embodiment of the invention, the electrode patterns have a rectangular shape as an example, but may have other shapes. The first to third common electrodes COM1 to COM3 thus formed serve as first to third touch driving electrodes Tx1, Tx2, and Tx3. Each electrode pattern forming the touch driving electrodes Tx1 to Tx3 serving as the common electrode may be formed so that its size corresponds to the pixel electrode at a ratio one to one.

Alternatively, each electrode pattern forming the touch driving electrodes Tx1 to Tx3 serving as the common electrode may be formed so that its size corresponds to several to several hundreds of pixel electrodes.

The first to third touch driving electrodes Tx1 to Tx3 include touch driving electrode resistance reducing wires TxW1 to TxW3, TxW4 to TxW6, and TxW7 to TxW9 for reducing a resistance thereof, respectively. More specifically, the first touch driving electrode Tx1 contacts the three first touch driving electrode resistance reducing wires TxW1 to TxW3 arranged in the y-axis direction; the second touch driving electrode Tx2 contacts the three second touch driving electrode resistance reducing wires TxW4 to TxW6 arranged in the y-axis direction; and the third touch driving electrode Tx3 contacts the three third touch driving electrode resistance reducing wires TxW7 to TxW9 arranged in the y-axis direction. The first to third touch driving electrode resistance reducing wires TxW1 to TxW3, TxW4 to TxW6, and TxW7 to TxW9 thus formed are connected to first to third driving routing pads TP1, TP2, and TP3 through first to third driving routing wires TL1, TL2, and TL3, respectively. The first to third touch driving electrode resistance reducing wires TxW1 to TxW3, TxW4 to TxW6, and TxW7 to TxW9 are formed of a metal material having a low resistance, for example, Al, AlNd, Mo, MoTi, Cu, Cr, Ag, and Ag-based alloys, so as to reduce the resistances of the first to third touch driving electrodes Tx1 to Tx3 formed of a transparent conductive material such as indium tin oxide (ITO), indium zinc oxide (IZO), and gallium-doped zinc oxide (GZO).

A thin film transistor (TFT) array TFTA is formed to cross connection portions of the first to third common electrodes COM1 to COM3 (i.e., the touch driving electrodes Tx1 to Tx3) and includes first to fourth touch sensing electrodes Rx1 to Rx4 forming electrode lines in a first direction (for example, x-axis direction).

The first to fourth touch sensing electrodes Rx1 to Rx4 are grouped into two parts by connection wires, and then the two parts are respectively connected to first and second touch sensing pads RP1 and RP2 through first and second touch sensing routing wires RL1 and RL2. More specifically, the first and second touch sensing electrodes Rx1 and Rx2 are connected to the first touch sensing pad RP1 through the first touch sensing routing wire RL1, and the third and fourth touch sensing electrodes Rx3 and Rx4 are connected to the second touch sensing pad RP2 through the second touch sensing routing wire RL2. The second embodiment of the invention described that the touch sensing electrodes are grouped into the two parts as an example, but is not limited thereto. For example, the touch sensing electrodes may be grouped into several to several hundreds of parts.

Further, the TFT array TFTA is formed to cross connection portions of the first to third touch driving electrodes Tx1 to Tx3. The TFT array TFTA includes first to third touch non-sensing electrodes RxR11 to RxR13, RxR21 to RxR23, and RxR31 to RxR33 arranged in the first direction (for example, x-axis direction) and the second direction (for example, y-axis direction).

In the first touch non-sensing electrodes RxR11 to RxR13, the 1-1 touch non-sensing electrodes RxR11 is formed to cross a connection portion between adjacent electrode patterns of the first touch driving electrode Tx1 and is connected to the first touch driving electrode Tx1 through a contact hole CH2 at a crossing. The 1-2 touch non-sensing electrodes RxR12 is formed to cross a connection portion between adjacent electrode patterns of the second touch driving electrode Tx2 and is connected to the second touch driving electrode Tx2 through the contact hole CH2 at a crossing. The 1-3 touch non-sensing electrodes RxR13 is formed to cross a connection portion between adjacent electrode patterns of the third touch driving electrode Tx3 and is connected to the third touch driving electrode Tx3 through the contact hole CH2 at a crossing.

In the second touch non-sensing electrodes RxR21 to RxR23, the 2-1 touch non-sensing electrodes RxR21 is formed to cross a connection portion between adjacent electrode patterns of the first touch driving electrode Tx1 and is connected to the first touch driving electrode Tx1 through the contact hole CH2 at a crossing. The 2-2 touch non-sensing electrodes RxR22 is formed to cross a connection portion between adjacent electrode patterns of the second touch driving electrode Tx2 and is connected to the second touch driving electrode Tx2 through the contact hole CH2 at a crossing. The 2-3 touch non-sensing electrodes RxR23 is formed to cross a connection portion between adjacent electrode patterns of the third touch driving electrode Tx3 and is connected to the third touch driving electrode Tx3 through the contact hole CH2 at a crossing.

In the third touch non-sensing electrodes RxR31 to RxR33, the 3-1 touch non-sensing electrodes RxR31 is formed to cross a connection portion between adjacent electrode patterns of the first touch driving electrode Tx1 and is connected to the first touch driving electrode Tx1 through the contact hole CH2 at a crossing. The 3-2 touch non-sensing electrodes RxR32 is formed to cross a connection portion between adjacent electrode patterns of the second touch driving electrode Tx2 and is connected to the second touch driving electrode Tx2 through the contact hole CH2 at a crossing. The 3-3 touch non-sensing electrodes RxR33 is formed to cross a connection portion between adjacent electrode patterns of the third touch driving electrode Tx3 and is connected to the third touch driving electrode Tx3 through the contact hole CH2 at a crossing.

The first to third touch non-sensing electrodes RxR11 to RxR13, RxR21 to RxR23, and RxR31 to RxR33 and the first to fourth touch sensing electrodes Rx1 to Rx4 are alternately disposed at a proper rate of number. In the example of FIG. 6, the first to third touch non-sensing electrodes RxR11 to RxR13, RxR21 to RxR23, and RxR31 to RxR33 and the first to fourth touch sensing electrodes Rx1 to Rx4 are alternately disposed in such a manner that the touch non-sensing electrodes RxR11 to RxR13, RxR21 to RxR23, or RxR31 to RxR33 of a first line are disposed and then the touch sensing electrodes Rx1 and Rx2 or Rx3 and Rx4 of a second line are disposed. However, the embodiment of the invention is not limited thereto. Namely, the disposition order and the disposition number of electrodes may be properly changed, if necessary or desired.

In the above-described configuration, the first to third touch non-sensing electrodes RxR11 to RxR13, RxR21 to RxR23, and RxR31 to RxR33 are not connected to the sensing routing wires and are connected to the first to third touch driving electrodes Tx1 to Tx3. Therefore, the first to third touch non-sensing electrodes RxR11 to RxR13, RxR21 to RxR23, and RxR31 to RxR33 do not serve as the touch sensing electrode and serve as the touch driving electrode. Thus, because mutual capacitance is not generated between the first to third touch non-sensing electrodes RxR11 to RxR13, RxR21 to RxR23, and RxR31 to RxR33 and electrode patterns of the touch sensing electrodes adjacent to them, the first to third touch non-sensing electrodes RxR11 to RxR13, RxR21 to RxR23, and RxR31 to RxR33 are not used as an effective electrode for the touch recognition. Hence, a touch non-effective area is formed as shown in FIG. 7.

In FIG. 7, reference symbols NTU1, NTU2, and NTU3 denote a touch non-effective area formed according to the second embodiment of the invention, and reference symbols TU1, TU2, TU3, TU4, TU5, and TU6 denote a touch effective area formed according to the second embodiment of the invention. The unit touch areas TU1, TU2, TU3, TU4, TU5, and TU6 each indicate an area in which the touch recognition is possible. As shown in FIG. 6, when the touch recognition is performed, the unit touch areas TU1, TU2, TU3, TU4, TU5, and TU6 include the touch non-effective areas NTU1, NTU2, and NTU3 formed by the first to third touch non-sensing electrodes RxR11 to RxR13, RxR21 to RxR23, and RxR31 to RxR33.

Next, the structure of the touch sensor integrated type display device is described in detail with reference to FIGS. 6, 8, and 9.

As shown in FIGS. 6, 8, and 9, the touch sensor integrated type display device according to the second embodiment of the invention includes gate lines GL and data lines DL which are formed on a substrate SUB1 of the TFT array TFTA to cross each other, thin film transistors TFT formed at crossings of the gate lines GL and the data lines DL, pixel electrodes Px formed in areas defined by crossings of the gate lines GL and the data lines DL, and common electrodes COM positioned opposite the pixel electrodes Px.

The thin film transistor TFT includes a gate electrode G extending from the gate line GL formed on the substrate SUB1, an active layer A which is formed on a gate insulation layer GI covering the gate line GL and the gate electrode G at a location corresponding to the gate electrode G, a source electrode S extending from the data line DL which is formed on a first passivation layer PAS1 covering the active layer A, and a drain electrode D positioned opposite the source electrode S. The thin film transistor TFT thus formed is covered by the first passivation layer PAS1, and a portion of the drain electrode D of the thin film transistor TFT is exposed through a first contact hole CH1 formed in the first passivation layer PAS1.

The first to third touch driving electrodes Tx1 to Tx3 serving as the common electrode are formed in parallel on the first passivation layer PAS1 defined by the crossings of the gate lines GL and the data lines DL, so that electrode lines are formed in the same direction as the data lines DL.

The first to third touch driving electrode resistance reducing wires TxW1 to TxW3, TxW4 to TxW6, and TxW7 to TxW9 for reducing the resistances of the first to third touch driving electrodes Tx1 to Tx3 are formed on the first to third touch driving electrodes Tx1 to Tx3.

A second passivation layer PAS2 is formed on the first passivation layer PAS1, on which the first to third touch driving electrodes Tx1 to Tx3 and the first to third touch driving electrode resistance reducing wires TxW1 to TxW3, TxW4 to TxW6, and TxW7 to TxW9 are formed. The second passivation layer PAS2 includes the second contact holes CH2 which are formed at the same position as the first contact hole CH1 exposing the drain electrode D of the thin film transistor TFT and expose the drain electrode D, and third contact holes CH3 formed at crossings between connection portions for connecting adjacent electrode patterns in a plurality of electrode patterns constituting each of the first to third touch driving electrodes Tx1 to Tx3 and the first to third touch non-sensing electrodes RxR11 to RxR13, RxR21 to RxR23, and RxR31 to RxR33.

The pixel electrodes Px, the first to third touch non-sensing electrodes RxR11 to RxR13, RxR21 to RxR23, and RxR31 to RxR33, and the touch sensing electrodes Rx1 to Rx4 are formed on the second passivation layer PAS2 including the second and third contact holes CH2 and CH3.

The pixel electrodes Px are formed in pixel areas defined by the crossings of the gate lines GL and the data lines DL. Each pixel electrode Px is connected to the drain electrode D of the thin film transistor TFT exposed through the first and second contact holes CH1 and CH2.

As shown in FIGS. 6, 8, and 9, the first to third touch non-sensing electrodes RxR11 to RxR13, RxR21 to RxR23, and RxR31 to RxR33 and the touch sensing electrodes Rx1 to Rx4 are formed between the pixel electrodes Px, which are adjacent to each other with the gate line GL interposed therebetween, in parallel with the gate line GL. FIGS. 8 and 9 show only the touch non-sensing electrodes of the touch non-effective area for the sake of brevity and ease of reading. The first to third touch non-sensing electrodes RxR11 to RxR13, RxR21 to RxR23, and RxR31 to RxR33 contact the first to third touch driving electrodes Tx1 to Tx3 exposed through the third contact holes CH3 and the first to third touch driving electrode resistance reducing wires TxW1 to TxW3, TxW4 to TxW6, and TxW7 to TxW9. When the first to third touch non-sensing electrodes RxR11 to RxR13, RxR21 to RxR23, and RxR31 to RxR33 are formed of a transparent conductive material such as ITO, IZO, and GZO, touch non-sensing electrode resistance reducing wires RxRW11 to RxRW13, RxRW21 to RxRW23, and RxRW31 to RxRW33 are formed to contact the first to third touch driving electrode resistance reducing wires TxW1 to TxW3, TxW4 to TxW6, and TxW7 to TxW9 through the second contact holes CH2, and the first to third touch non-sensing electrodes RxR11 to RxR13, RxR21 to RxR23, and RxR31 to RxR33 are respectively formed on the touch non-sensing electrode resistance reducing wires RxRW11 to RxRW13, RxRW21 to RxRW23, and RxRW31 to RxRW33. When the first to third touch non-sensing electrodes RxR11 to RxR13, RxR21 to RxR23, and RxR31 to RxR33 are formed to cover the touch non-sensing electrode resistance reducing wires RxRW11 to RxRW13, RxRW21 to RxRW23, and RxRW31 to RxRW33, the touch non-sensing electrode resistance reducing wires RxRW11 to RxRW13, RxRW21 to RxRW23, and RxRW31 to RxRW33 may be prevented from being corroded.

The touch non-sensing electrode resistance reducing wires RxRW11 to RxRW13, RxRW21 to RxRW23, and RxRW31 to RxRW33 for resistance reduction are respectively formed on the touch non-sensing electrodes RxR11 to RxR13, RxR21 to RxR23, and RxR31 to RxR33 of the touch non-effective areas NTU1 to NTU3. Touch sensing electrode resistance reducing wires RxW1 to RxW4 for resistance reduction are respectively formed on the touch sensing electrodes Rx1 to Rx4 of the touch effective areas TU1 to TU6. The touch sensing electrodes Rx1 to Rx4 are connected to the first and second touch sensing routing wires RL1 and RL2 based on a predetermined rate of number, and thus may be easily grouped.

In the second embodiment of the invention, the touch driving electrodes Tx1 to Tx3 serving as the common electrode are formed to overlap the pixel electrodes Px and are connected to one another in an arrangement direction of the data lines DL, thereby forming three driving electrode lines as shown in FIG. 6. Further, each of the touch sensing electrodes Rx1, Rx2, and Rx3 serving as the common electrode may have a plurality of slits SL.

In the touch sensor integrated type display device according to the second embodiment of the invention, as shown in FIGS. 8 and 9, the touch driving electrodes Tx1 to Tx3 serving as the common electrode formed on the first passivation layer PAS1 has no slit, and the pixel electrode Px formed on the second passivation layer PAS2 have the slits SL.

In the touch sensor integrated type display device according to the second embodiment of the invention, the common electrode performed the function of the touch driving electrode as well as its function. However, the common electrode may perform a function of the touch sensing electrode. In this instance, the touch sensing electrode according to the second embodiment of the invention has to be configured as the touch driving electrode.

In general, if all of the touch driving electrodes and the touch sensing electrodes are used as the touch effective electrodes, the touch driving electrodes and the touch sensing electrodes may be adjacent to each other at a very short distance, and also the number of crossings between the touch driving electrodes and the touch sensing electrodes may increase. In a general capacitive touch sensor, a unit touch effective block (i.e., a base unit for recognizing the touch operation) is configured so that it corresponds to several to several hundreds of pixel electrodes. Therefore, the mutual capacitance generated between the touch driving electrodes and the touch sensing electrodes in the touch sensor integrated type display device according to the embodiment of the invention is several tens of times larger than the general capacitive touch sensor. A sharp increase in the mutual capacitance in the embodiment of the invention may reduce touch sensitivity and may increase a parasitic capacitance, thereby reducing a touch performance.

However, in the touch sensor integrated type display device according to the first and second embodiments of the invention, as described above, the number of touch driving electrodes or the number of touch sensing electrodes used as the touch effective electrode may decrease by connecting the touch non-driving electrodes to the touch sensing electrode or by connecting the touch non-sensing electrodes to the touch driving electrode. Thus, the mutual capacitance between the touch driving electrodes and the touch sensing electrodes may be reduced. Hence, a reduction in the touch sensitivity and an increase in the parasitic capacitance may be prevented, and the touch performance may be improved.

As described above, the touch sensor integrated type display device according to the first and second embodiments of the invention can use the common electrode, which is used to form an electric field required to drive the liquid crystals of the display device, along with the pixel electrode as the touch driving electrode or the touch sensing electrode, thereby making it possible to omit a process for forming the touch driving electrode or the touch sensing electrode and reduce a thickness of the touch sensor integrated type display device by a thickness of the touch driving electrode or the touch sensing electrode.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensor integrated type display device comprising:
   a plurality of gate lines and a plurality of data lines which are formed to cross over each other;
   a plurality of pixel electrodes respectively formed in pixel areas defined by crossings of the plurality of gate lines and the plurality of data lines;
   a first electrode formed between first pixel electrodes and in parallel with a first gate line of the plurality of gate lines, the first pixel electrodes being adjacent to each other with the first gate line interposed therebetween a first electrode formed between first pixel electrodes and in parallel with a first gate line of the plurality of gate lines, the first pixel electrodes being adjacent to each other with the first gate line interposed therebetween, and the first electrode serving as one of a touch driving electrode and a touch sensing electrode for a touch operation;
   a plurality of second electrodes formed between second pixel electrodes and arranged in a line in parallel with a second gate line adjacent to the first gate line, the second pixel electrodes being adjacent to each other with the second gate line interposed therebetween; and
   a plurality of third electrodes, each of which is formed in parallel with the data lines and contacts the plurality of second electrodes without contacting the first electrode,
   wherein at least a portion of each of the plurality of third electrodes overlaps the first and second pixel electrodes,
   wherein the plurality of third electrodes serve as touch sensing electrodes if the first electrode serves as the touch driving electrode, and serve as touch driving electrodes if the first electrode serves as the touch sensing electrode for the touch operation, and
   wherein the plurality of third electrodes serve as common electrodes with a common voltage for a display operation.

2. The touch sensor integrated type display device of claim 1, wherein the first electrode is a touch driving electrode, and the plurality of third electrodes serve as touch sensing electrodes for the touch operation.

3. The touch sensor integrated type display device of claim 1, wherein the first electrode is a touch sensing electrode, and the plurality of third electrodes serve as touch driving electrodes for the touch operation.

4. The touch sensor integrated type display device of claim 1, further comprising at least one first electrode resistance reducing wire configured to overlap the first electrode along a direction of the first electrode and reduce a resistance of the first electrode.

5. The touch sensor integrated type display device of claim 1, further comprising at least one second electrode resistance reducing wire configured to overlap each of the plurality of second electrodes along a direction of the second electrodes and reduce resistances of the second electrodes.

6. The touch sensor integrated type display device of claim 1, further comprising at least one third electrode resistance reducing wire configured to overlap each of the plurality of third electrodes along a direction of the third electrodes and reduce resistances of the third electrodes.

7. A touch sensor integrated type display device comprising:
   a plurality of gate lines formed in parallel on a substrate;
   a gate insulating layer configured to cover the gate lines;
   a plurality of data lines formed on the gate insulating layer to cross over the gate lines;
   a plurality of thin film transistors respectively formed in a plurality of pixel areas defined by crossings of the gate lines and the data lines;
   a first passivation layer configured to cover the gate insulating layer, on which the plurality of thin film transistors are formed;
   a plurality of pixel electrodes formed on the first passivation layer in the plurality of pixel areas, respectively;
   a first electrode formed between first pixel electrodes and in parallel with a first gate line of the plurality of gate lines, the first pixel electrodes being adjacent to each other with the first gate line interposed therebetween, and the first electrode serving as one of a touch driving electrode and a touch sensing electrode for a touch operation;
   a plurality of second electrodes formed between second pixel electrodes and arranged in a line in parallel with a second gate line adjacent to the first gate line, the second pixel electrodes being adjacent to each other with the second gate line interposed therebetween; and
   a second passivation layer configured to cover the first electrode and the plurality of second electrodes, the second passivation layer including contact holes exposing the plurality of second electrodes; and
   a plurality of third electrodes, each of which is formed in parallel with the data lines and contacts the plurality of second electrodes through the contact holes without contacting the first electrode,
   wherein at least a portion of each of the plurality of third electrodes overlaps the first and second pixel electrodes,
   wherein the plurality of third electrodes serve as touch sensing electrodes if the first electrode serves as the touch driving electrode, and serve as touch driving electrodes if the first electrode serves as the touch sensing electrode for the touch operation, and
   wherein the plurality of third electrodes serve as common electrodes with a common voltage for a display operation.

8. The touch sensor integrated type display device of claim 7, wherein the first electrode is a touch driving electrode, and the plurality of third electrodes serve as touch sensing electrodes for the touch operation.

9. The touch sensor integrated type display device of claim 7, wherein the first electrode is a touch sensing electrode, and the plurality of third electrodes serve as touch driving electrodes for the touch operation.

10. A touch sensor integrated type display device comprising:
- a plurality of gate lines formed in parallel on a substrate;
- a gate insulating layer configured to cover the gate lines;
- a plurality of data lines formed on the gate insulating layer to cross the gate lines;
- a plurality of thin film transistors respectively formed in a plurality of pixel areas defined by crossings of the gate lines and the data lines;
- a first passivation layer configured to cover the gate insulating layer, on which the plurality of thin film transistors are formed;
- a plurality of first electrodes positioned on the first passivation layer and arranged in parallel with the data lines, each of the plurality of first electrodes being formed in at least two pixel areas which are positioned with the gate line interposed therebetween;
- a second passivation layer configured to cover the plurality of first electrodes, the second passivation layer including a plurality of contact holes exposing the plurality of first electrodes;
- a plurality of pixel electrodes formed on the second passivation layer in the plurality of pixel areas, respectively, at least a portion of each of the plurality of pixel electrodes overlapping the first electrode;
- a second electrode formed on the second passivation layer between first pixel electrodes and in parallel with a first gate lines of the plurality of gate lines, the first pixel electrodes being adjacent to each other with the first gate line interposed therebetween; and
- a third electrode formed on the second passivation layer between second pixel electrodes, arranged in a line in parallel with a second gate line adjacent to the first gate line, and contacting the plurality of first electrodes exposed through the plurality of contact holes, the second pixel electrodes being adjacent to each other with the second gate line interposed therebetween.

11. The touch sensor integrated type display device of claim 10, wherein the plurality of first electrodes serve as both a touch driving electrode and a common electrode, and the plurality of second electrodes are a touch sensing electrode.

12. The touch sensor integrated type display device of claim 10, wherein the plurality of first electrodes serve as both a touch sensing electrode and a common electrode, and the plurality of second electrodes are a touch driving electrode.

* * * * *